United States Patent [19]

Kennedy et al.

[11] Patent Number: 5,412,516
[45] Date of Patent: May 2, 1995

[54] DATA STORAGE SYSTEM WITH A DUAL-GAP HEAD USING A DUAL-MODE FLEXIBLE DISK CONTROLLER

[75] Inventors: Ronald R. Kennedy; Daniel J. Curran, both of Fort Collins, Colo.

[73] Assignee: Hewlett-Packard Company, Palo Alto, Calif.

[21] Appl. No.: 151,598

[22] Filed: Nov. 12, 1993

Related U.S. Application Data

[63] Continuation-in-part of Ser. No. 23,257, Feb. 25, 1993, abandoned.

[51] Int. Cl.[6] .......................................... G11B 15/12
[52] U.S. Cl. .............................. 360/62; 360/63; 360/75; 360/113; 360/121
[58] Field of Search .................... 360/51, 63, 75, 60, 360/113, 121, 126, 62

[56] References Cited

U.S. PATENT DOCUMENTS

| | | | |
|---|---|---|---|
| 4,703,355 | 10/1987 | Cooper et al. | 360/26 X |
| 4,779,149 | 10/1988 | Watanabe | 360/75 X |
| 4,803,571 | 2/1989 | Fujioka et al. | 360/63 |
| 4,809,090 | 2/1989 | Suzuki | 360/51 X |
| 4,914,534 | 4/1990 | Chito | 360/60 X |
| 5,218,497 | 6/1993 | Tanabe et al. | 360/113 |
| 5,289,328 | 2/1994 | Saliba | 360/121 |

OTHER PUBLICATIONS

QIC Development Standard QIC-3010-MC Rev. A, Jun. 1993, p. 13.

*Primary Examiner*—Aristoteli Psitos
*Assistant Examiner*—James L. Habermehl
*Attorney, Agent, or Firm*—Augustus W. Winfield

[57] ABSTRACT

A data storage system such as a tape drive or flexible disk drive having a dual-gap head being controlled by a dual-mode flexible disk controller. The flexible disk controller has a first mode designed to use a head having one section for perpendicular reading and writing and a second section for erasing. The flexible disk controller has a second mode designed to use a conventional flexible disk head having a single gap for reading, writing and erasing. The data storage system has a head which has one relatively long gap optimized for overwrite/erase capability and a separate shorter read-only gap optimized for reading high bit densities. The data storage system uses the flexible disk controller in its first mode for formatting and writing and in its second mode for reading. When the controller is being used in a perpendicular recording mode, the head design with the write section offset from the erase section requires extended formatted sector fields. The data storage system takes advantage of these extended formatted data sector fields to accommodate a dual-gap head with an offset between the read gap and the write gap.

8 Claims, 7 Drawing Sheets

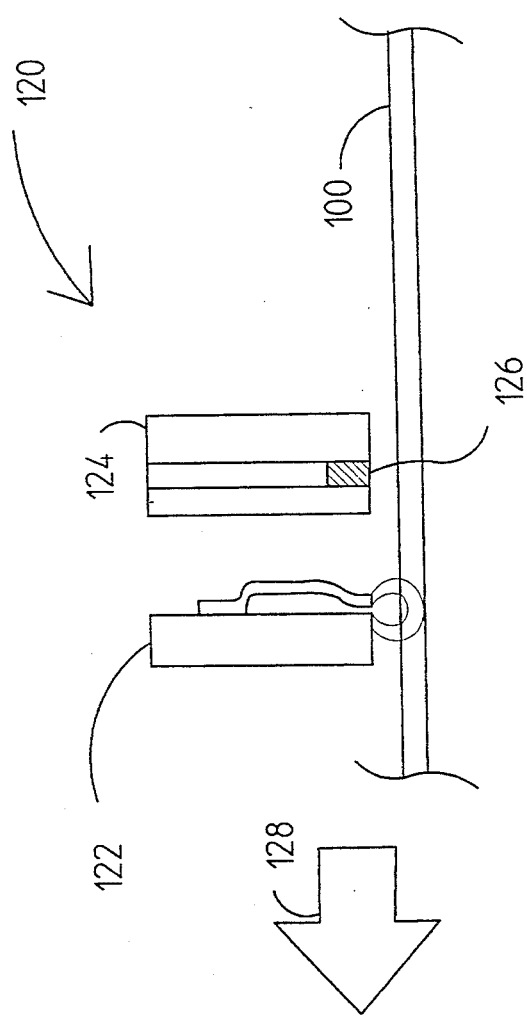
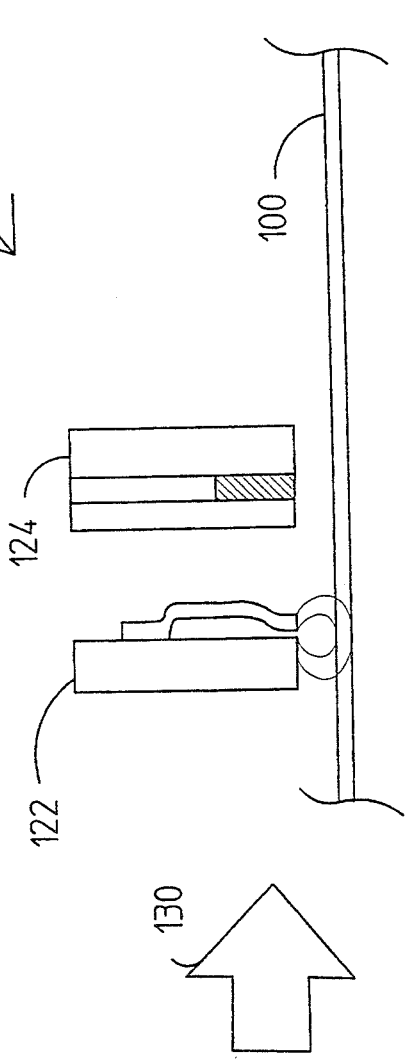

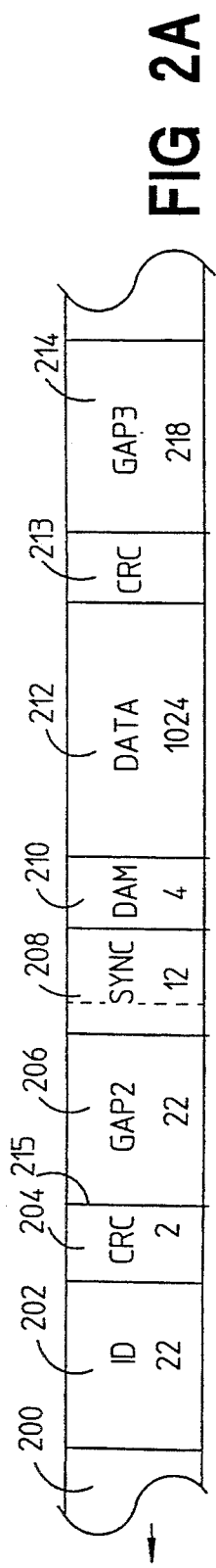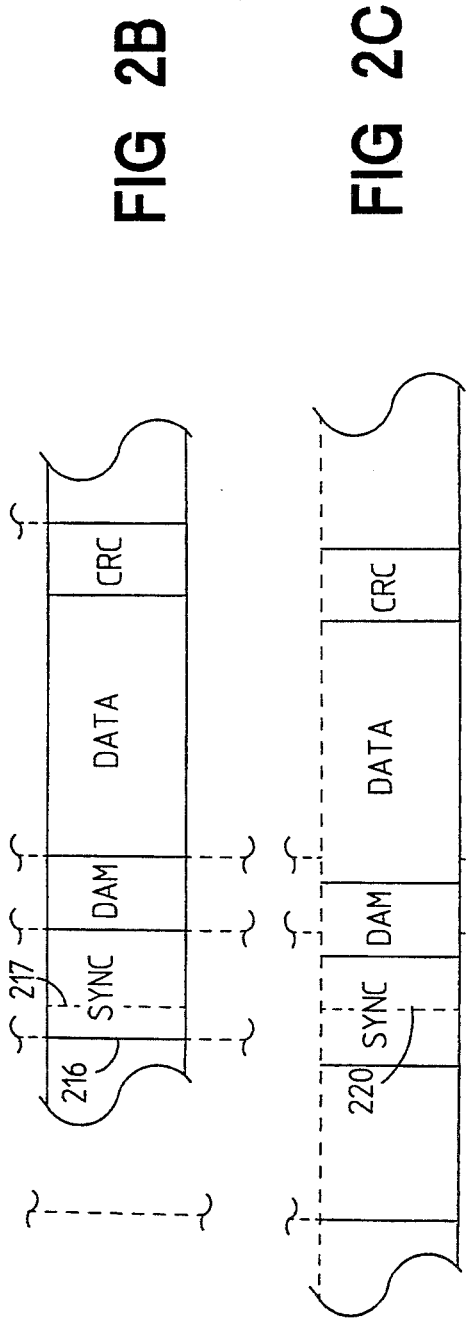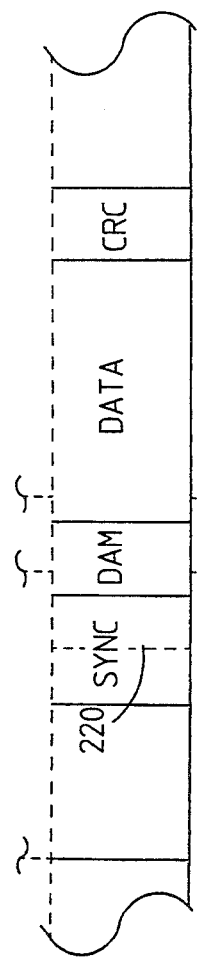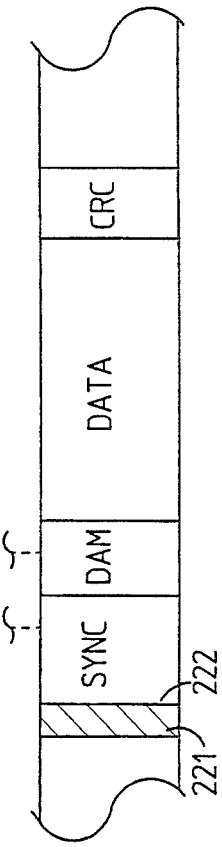

DATA STORAGE SYSTEM WITH A DUAL-GAP HEAD USING A DUAL-MODE FLEXIBLE DISK CONTROLLER

This is a continuation-in-part of application Ser. No. 08/023,257 filed on Feb. 25, 1993, now abandoned.

FIELD OF INVENTION

This invention relates generally to tape drives and flexible disk drives for data storage and more specifically to use of a dual-gap head with a flexible disk controller.

BACKGROUND OF THE INVENTION

The original IBM-PC computer had a 5.25 inch flexible disk drive for removable mass storage. The data format used by that original 5.25 inch flexible disk drive has become a *de facto* standard for both flexible disks and data storage tapes. Personal computers which are compatible with the IBM-PC/AT computer typically have several higher capacity 5.25 and 3.5 inch flexible disk drives which use a data format which is compatible with the original IBM-PC 5.25 inch flexible disk data format. These computers typically have one flexible disk controller which is shared by all the flexible disk drives. It is common to use that flexible disk controller to also control a data storage tape drive. Originally, both flexible disk drives and compatible tape drives used magnetic heads having a single gap for reading, writing and data erasing plus a separate pair of gaps for trimming the edges between tracks.

Conventional magnetic heads have a gap for writing dam longitudinally along the surface of magnetic recording media. Higher bit densities require shorter read gap lengths. However, in general, if a write gap becomes too short, the fields from the short write gap may not extend far enough into the magnetic medium to effectively overwrite or erase previously recorded data. One solution to higher bit densities is to use a separate gap for erasing or to use a head assembly with one section optimized for writing and a separate section optimized for reading.

Another solution to higher bit densities is to orient magnetic polarity changes vertically within the magnetic medium (perpendicular to the surface) rather than longitudinally (parallel to the surface). This is typically accomplished with special media having a high permeability layer below the data layer. Flexible disk drives and compatible controllers are now available which can accommodate perpendicular recording read/write heads. Examples of commercially available controllers include the 82077SL disk controller from Intel Corporation and the 8477 disk controller from National Semiconductor Corporation. These controllers are actually dual, mode controllers in that they can be used with perpendicular recording read/write heads in a first mode or with conventional heads in a second mode.

Flexible disk controllers designed for perpendicular recording are designed specifically for drives in which the magnetic medium is rotating in a single direction. In addition, the controllers are designed specifically for a head with a separate erase gap which always precedes the writing portion of the head so that the head can erase before writing. These controllers simultaneously erase during every write operation.

In contrast, tape drives typically record in a serpentine fashion in which the tape movement relative to the head is bidirectional. If a bidirectional tape drive used a head with a single erase gap offset from the write gap, data written in one of the two directions would immediately be erased by the trailing erase gap. A head could be fabricated with both leading and trailing erase gaps but this would make the head much more expensive. There is a need for tape drive systems with low cost heads which are appropriate for bidirectional tapes and which can still share standard commercially available flexible disk drive controllers. In addition, there is a need for higher density flexible disk drives with conventional media.

Data storage disks and tapes are typically divided into fixed size data blocks called sectors. These sectors are typically further subdivided into fields for synchronization and error detection. In addition, there are areas between fields and sectors to accommodate variations in speed from drive to drive. These areas between fields are called GAPs. In this specification, to help distinguish between a gap in a magnetic head and a media format GAP, head gaps are lower case and media GAPs are capitalized.

SUMMARY OF THE INVENTION

The present invention adapts a commercially available flexible disk controller designed for perpendicular mode heads for use with a dual-gap head suitable for high-density bidirectional tapes and suitable for high-density flexible disk drives using conventional media. The dual-gap head used in the present invention has one gap optimized for writing and erasing and a separate gap optimized for reading.

The controller is designed for both perpendicular recording with a head which has a read/write section offset from an erase section and for longitudinal recording using conventional single-gap heads. Perpendicular recording heads having an offset between sections require a data sector format which has a GAP field between the sector ID field and the dam field which is longer than the corresponding GAP field for conventional heads. The present invention takes advantage of this extended sector field to accommodate a dual-gap head with an offset between the read gap and the write gap. The present invention uses the controller in a perpendicular recording mode for formatting and writing and uses the controller in a conventional mode for reading.

BRIEF DESCRIPTION OF THE DRAWINGS

FIG. 1C is a cross-section of a magnetic head assembly having one gap for reading and a second gap for writing and erasing with media movement relative to the head such that writing lags reading.

FIG. 1D is a cross-section of a magnetic head assembly having one gap for reading and a second gap for writing and erasing with media movement relative to the head such that writing leads reading.

FIG. 2A is a top view of the surface of a magnetic medium illustrating a conventional data sector formatted for a conventional single-gap head.

FIG. 2B is a top view of the surface of a magnetic medium illustrating a portion of the conventional data sector of FIG. 2A as rewritten by a conventional single-gap head (FIG. 1A).

FIG. 2C is a top view of the surface of a magnetic medium illustrating a portion of the conventional data sector of FIG. 2A as rewritten by a dual-gap head with a write/erase gap lagging the read gap (FIG. 1C).

FIG. 2D is a top view of the surface of a magnetic medium illustrating a portion of the conventional data sector of FIG. 2A as rewritten by a dual-gap head with a write/erase gap leading the read gap (FIG. 1D).

DETAILED DESCRIPTION OF THE PREFERRED EMBODIMENT OF THE INVENTION

Figure 1A:
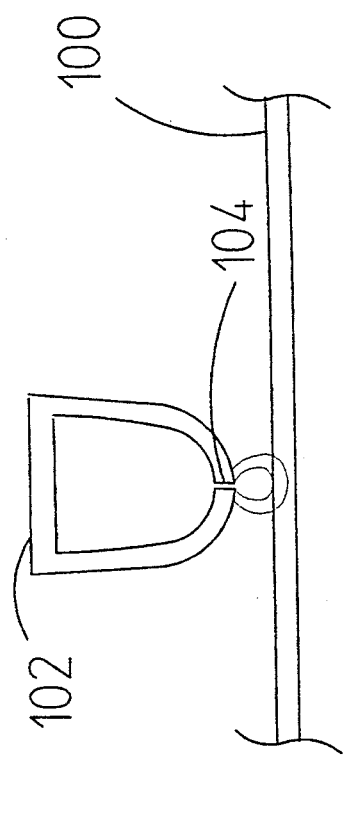
FIG. 1A is a cross-section of a magnetic head having a single gap for reading, writing and erasing.

FIGS. 1A-1D illustrate cross-sections of magnetic head configurations to illustrate the application of the present invention. FIG. 1A illustrates a magnetic recording medium 100 (for example flexible disk or magnetic tape) and a magnetic head 102 with a single gap 104 used to both read and write. The magnetic head 102 illustrated in FIG. 1A can be used for bidirectional motion (arrow 106) of the medium 100 relative to the head 102.

Figure 1B:
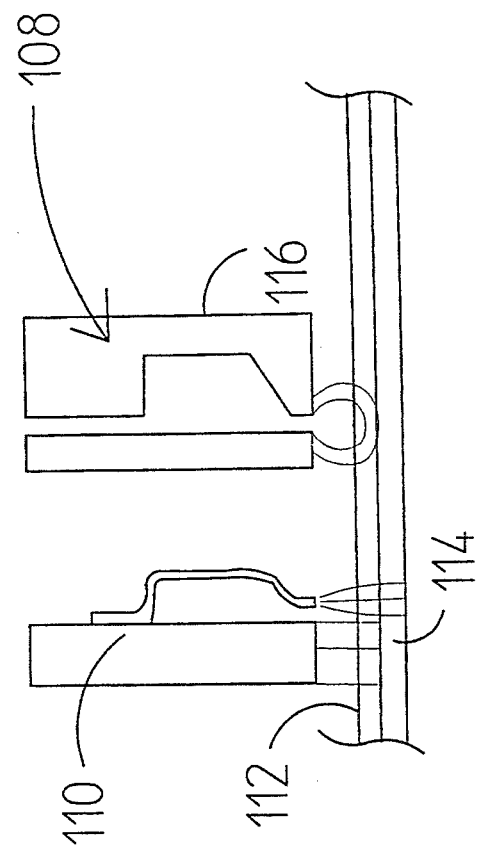
FIG. 1B is a cross-section of a magnetic head assembly having one section for erasing and a second section for perpendicular reading and writing.

FIG. 1B illustrates a magnetic head assembly 108 having a first section 110 for reading and writing in a perpendicular mode. The perpendicular mode medium 112 has a special substrate layer 114 having high permeability. Magnetic lines of flux pass vertically from a thin film pole on section 110 into the high permeability layer 114 and back into section 110. A second section 116 is used exclusively for erasing. The head assembly 108 can only be used for a medium 112 moving in one direction (arrow 118) so that erasure (section 116) always precedes writing (section 110).

FIGS. 1C and 1D illustrate a magnetic head assembly 120 which has one thin-film section 122 used for writing and erasing. A second section 124 is used exclusively for reading. The particular head design illustrated in FIG. 2 uses a magnetoresistive element 126 for reading. FIG. 1C illustrates the medium 100 moving relative to the head assembly 120 in a direction 128 such that the write/erase section 122 effectively lags the read section 124. FIG. 1D illustrates the same head assembly 120 and medium 100 as in FIG. 1C but in FIG. 1D the medium 100 is moving relative to the head assembly 120 in a direction 130 such that the write/erase section 122 effectively leads the read section 124.

Tapes for the present invention have multiple tracks lying longitudinally along the length of the tape. Flexible disks for the present invention have concentric circular tracks. Tracks are divided in segments and segments are divided in sectors. FIG. 2A illustrates the format of one data sector on a magnetic tape 200 as formatted by a conventional flexible disk controller for a conventional single-gap head (FIG. 1A, 102). The sector is partitioned into multiple fields. The number at the bottom of each field in FIG. 2A indicates the length of the field in bytes.

The first two fields in FIG. 2A are the sector ID field 202 (22 bytes) followed by a Cyclic Redundancy Code (CRC) field 204 (2 bytes) used for error detection in reading the sector ID field 202. The next field is the GAP2 field 206 (22 bytes). GAP2 206 is followed by a synchronization (SYNC) field 208 which is used to synchronize a phase-locked-loop used to decode data. The next field after synchronization is a Data Address Mark (DAM) field 210 (4 bytes) used to indicate the transition from the synchronization pattern to data and to enable the controller to align the data to byte boundaries. The next field is the DATA field 212 (1024 bytes) followed by a DATA CRC field 213 used for error detection in reading the DATA field 212. The last field is the GAP3 field 214. The length of the GAP3 field 214 is programmable and is a function of the permitted long term speed variation of the drive. For typical tape drives with a long term speed tolerance of $+/-3\%$, the length of the GAP3 field is 218 bytes.

Segment headers have a similar SYNC/ID/GAP field structure (not illustrated). In particular, GAP1 (not illustrated) is a GAP field between a segment header and the first sector of a segment.

When data is rewritten after formatting, some of the fields illustrated in FIG. 2A are rewritten and some remain intact as formatted. The ID field 202, ID CRC field 204 and GAP2 field 206 all remain as originally formatted. The SYNC field 208, the Data Address Mark (DAM) field 210, the DATA field 212 and the DATA CRC field 213 are all rewritten. When writing, the controller reads the ID field 202 and the ID CRC field 204 and then waits without reading for a time equivalent to 22 bytes before writing a new SYNC field 208. The GAP2 field 206 is not read.

GAP fields are formatted with a binary pattern corresponding to Hexadecimal 4E repeated over and over. SYNC fields are formatted with Hexadecimal 00. In general, data for flexible disks is encoded in Modified Frequency Encoding (also called Miller or MFM encoding) which encodes clock transitions along with data. However, DAM fields are formatted with a unique data pattern which is Hexadecimal A1 with a missing clock transition. This unique pattern will not occur anywhere else on the medium except in the DAM fields. Typically, the controller logic incorporates a logic state machine. As specific field patterns are detected, the controller switches the state machine to a state which monitors the data for the next expected pattern. If the controller logic is in a state which is monitoring data for a match to the SYNC pattern (00), detection of the SYNC pattern causes the state machine to begin searching for non-SYNC data. The controller assumes that the next non-SYNC pattern is an address mark. If the next non-SYNC pattern does not match the unique DAM pattern an error is generated.

In FIG. 2B, there is a pattern discontinuity at boundary 216 where the SYNC pattern is rewritten at the end of GAP2 field 206. This discontinuity is called a write splice. The phase-locked-loop must be enabled after the write splice at boundary 216 to synchronize correctly. During a data read operation, when the read gap has finished reading the ID CRC field 204, the controller automatically waits for a time equivalent to 24 bytes before enabling the phase-locked-loop to lock to the incoming data. Then the controller switches to a controller state which monitors data for a match to the SYNC pattern. Therefore, phase-locked-loop synchronization typically starts at boundary 217 which is about 2 bytes beyond the boundary between the GAP2 field 206 and the SYNC field 208. During a read operation, the phase locked loop must have a uninterrupted synchronization pattern for a minimum byte length or the phase-locked-loop may synchronize incorrectly or it may not lock to the synchronization pattern.

Recall from the discussion above that during writing, writing of the SYNC field 208 starts at a time equivalent to 22 bytes after the read gap crosses boundary 215. That is, writing starts when the read gap is at boundary 216. For a single-gap head (FIG. 1A), writing will start at boundary 216. For a dual-gap head (FIGS. 1C and 1D), writing will start when the read gap is at boundary 216 but the write gap may be leading or lagging the read gap. The effect of this leading or lagging is as follows.

If a dual-gap head is used and the direction of medium movement relative to the head is such that the write section lags the read section (FIG. 1C), then at the time the read section (FIG. 1C, 124) is over the boundary 216, the write section (FIG. 1C, 122) is still physically over part of the GAP2 field 206. If the write section of the head starts writing immediately when the read gap is over the boundary 216, the write gap will overwrite part of the original GAP2 field with the synchronization pattern. This is illustrated in FIG. 2C. During a subsequent read operation, when the read gap is at the boundary 215 between the ID CRC field 204 and the GAP2 field 206, the controller will wait 24 bytes before enabling the phase-locked-loop to synchronize on incoming data. Therefore, the phase-locked-loop will be enabled some distance into the rewritten SYNC field as illustrated by the dashed line 220 in FIG. 2C. As a result, the phase-locked-loop will not receive the customary 10 bytes of synchronization pattern and may not properly synchronize.

If a dual-gap head is used and the direction of medium movement relative to the head is such that the write gap leads the read gap (FIG. 1D), then at the time the read gap (FIG. 1D, 124) is over the boundary 216, the write gap (FIG. 1D, 122) is physically over the SYNC field 208. If the write section of the head starts writing immediately when the read gap is over the boundary 216, the write gap will leave part of the old SYNC field 208 intact. This is illustrated in by the cross-hatched area 221 in FIG. 2D. There is a new write splice 222. During a subsequent read operation, when the read gap is over the boundary 215 between the ID CRC field 204 and the GAP2 field 206, the controller will wait 24 bytes before enabling the phase-locked-loop to lock to the incoming data and then switching to a state which monitors data for a match to the SYNC pattern. Depending on speed variation and read-to-write gap spacing, this may be several bytes before the write splice 222. If enough of the old SYNC pattern remains for the controller to detect the SYNC field, the controller will then look for the first non-SYNC byte. The controller will assume that the first non-SYNC byte is the DAM. If the decoded pattern does not match that of a DAM pattern then an error ("MISSING DATA ADDRESS MARK IN THE DATA FIELD") will result. In addition to this potential problem, the uncertain data pattern resulting from the write splice 222 may cause the phase-locked-loop to fail to lock or to mis-lock on a harmonic frequency.

From the above, it can be seen that a dual-gap head cannot be used with the conventional format unless the read gap to write gap spacing is very small. In general, spacing such gaps very close together increases the cost of manufacturing such a head. However, by using a new format designed for perpendicular recording (along with an additional delay circuit) the problems can be overcome without the additional cost of very close gap spacing.

Figure 3A:
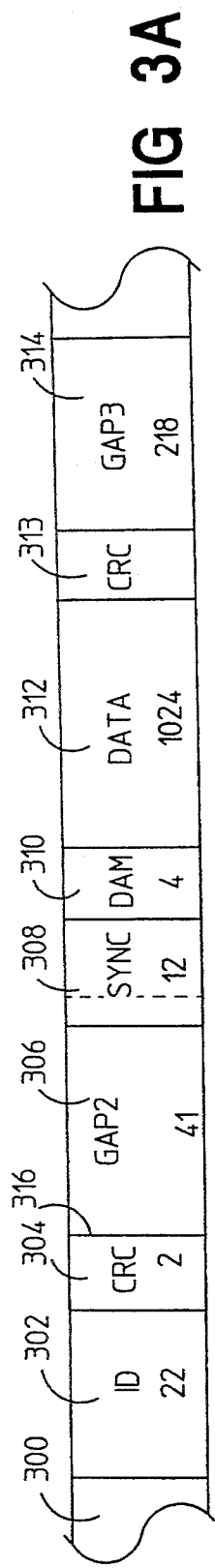
FIG. 3A is a top view of the surface of a magnetic medium illustrating a data sector formatted for perpendicular recording head (FIG. 1B).

FIG. 3A illustrates the format of one data sector on a magnetic medium 300 as formatted by a flexible disk controller for a perpendicular recording head (FIG. 1B, 108). Comparing FIG. 3A with FIG. 2A, note that the GAP2 field for perpendicular recording is 41 bytes long (FIG. 3A, 306) compared to 22 bytes for conventional head formatting (FIG. 2A, 206).

Figure 3B:
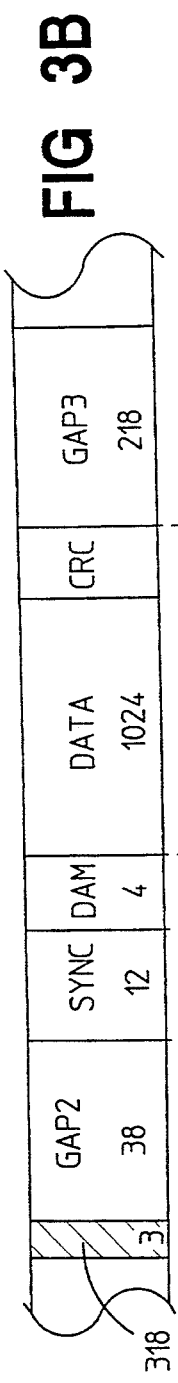
FIG. 3B is a top view of the surface of a magnetic medium illustrating a portion of the data sector of FIG. 3A as rewritten by a perpendicular recording head (FIG. 1B).

When new data is written using a perpendicular mode head, the erase section of the head (FIG. 1B, 116) pre-erases before new data is written. When the read/write portion (FIG. 1B, 110) of the head is over the ID CRC field boundary 316, the erase section of the head is over the GAP2 field 306. When the controller is rewriting data in a perpendicular mode, it pre-erases and rewrites 38 bytes of GAP2 data, along with all of the SYNC (308), DAM (310), and DATA (312) and DATA CRC (313) fields. This ensures that at the time the read/write gap writes the new SYNC field 308, the media has been properly pre-erased. This is illustrated in FIG. 3B. Note that 3 bytes of the original GAP2 remain (318).

Note that the situation just described for a perpendicular head with a leading erase gap is functionally similar to the situation described in conjunction with FIG. 2D for a dual-gap head with writing leading reading. In the present invention, this controller perpendicular recording mode, which is designed for an offset erase gap, is slightly modified to solve the problems discussed above in conjunction with FIGS. 2C and 2D for an offset write gap.

Figure 3C:
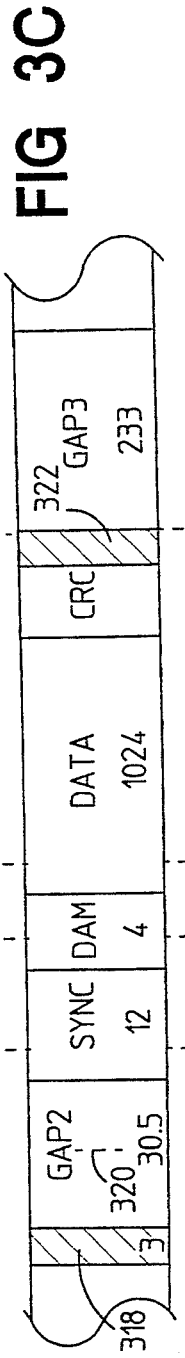
FIG. 3C is a top view of the surface of a magnetic medium illustrating a portion of the data sector of FIG. 3A as rewritten by a dual-gap head with a write/erase gap lagging the read gap (FIG. 1C).

FIG. 3C illustrates a sector with new dam as rewritten by a dual-gap head with media motion relative to the head such that the write/erase gap effectively lags the read gap (FIG. 1C). For medium motion in this direction, at the time the read gap is over the ID CRC field boundary 316, the write gap is over the ID field 302. The flexible disk controller automatically starts sending 38 bytes of GAP2 data 3 bytes after detecting boundary 316. To avoid overwriting part of the ID field 302 and the ID CRC field 304, additional circuitry (FIGS. 4, 5 and 6) is added in the present invention to suppress or delay writing for a number of bytes which is a function of read-write gap spacing, speed variation and bit density. As a result, only part of the GAP2 field 306 is overwritten. In addition, a number of bytes of the original DATA field 312 (with DATA CRC field 313) are not overwritten (322). However, leaving part of the DATA field 312 intact is a normal occurrence when writing and rewriting in drives having different speeds.

The present invention places the flexible disk controller back into conventional mode when reading. Recall from the discussion of FIG. 2A, when reading data in conventional mode, the flexible disk controller reads the CRC ID field 204 and then waits for a time equivalent to 24 bytes before enabling the phase-locked-loop to lock onto incoming data and before searching for the SYNC pattern. When reading data written as illustrated in FIG. 3C, the flexible disk controller reads the CRC ID field 304 and waits for a time equivalent to 24 bytes before enabling the phase-locked-loop. As a result, the controller enables the phase-locked-loop and begins searching for the SYNC pattern in the GAP2 field 306 as illustrated by the dashed line 320. Until the SYNC field 308 is reached, the phase-locked-loop tracks the incoming GAP pattern and the controller looks for the SYNC pattern. In contrast to FIG. 2B, in FIG. 3C the boundary between the GAP2 field 306 and the SYNC field 308 is not a write splice because the GAP2 field 306 and the SYNC field 308 are rewritten in one continuous write operation. Therefore, there is no discontinuity to cause mis-locking on a harmonic frequency. The phase-locked-loop synchronizes correctly on the full 12-byte SYNC field 308. When the controller detects the SYNC pattern it starts looking for a non-SYNC address mark pattern (DAM field).

Figure 3D:
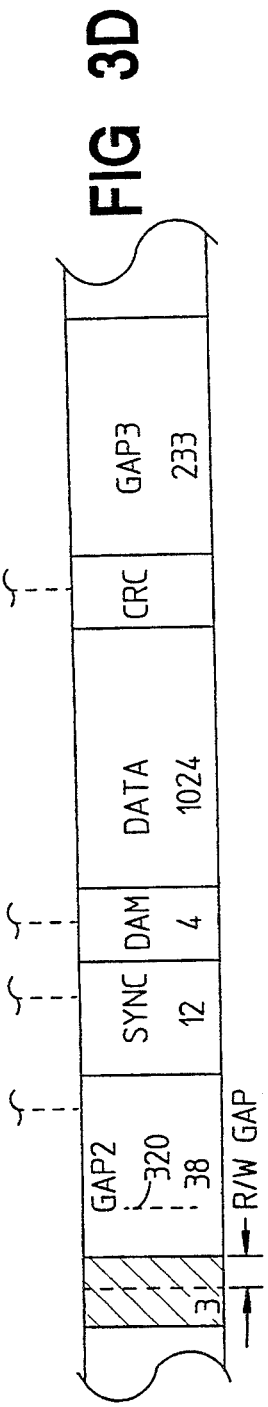
FIG. 3D is a top view of the surface of a magnetic medium illustrating a portion of the data sector of FIG. 3A as rewritten by a dual-gap head with a write/erase gap leading the read gap (FIG. 1D).

FIG. 3D illustrates a sector as formatted in FIG. 3A and partially rewritten as in FIG. 3B but using a dual-gap head with media motion relative to the head such that the write/erase gap effectively leads the read gap (FIG. 1D). At the time the ID CRC boundary 316 is detected, the write gap (FIG. 1C, 122) of the head is over the GAP2 field 306. For medium motion as illustrated in FIG. 1D, the controller starts writing new GAP2 bytes further into the GAP2 field 306 than that for a perpendicular mode head as illustrated in FIG. 3B. As a result, 3 bytes plus the read-to-write (R/W) gap spacing (in bytes) are not overwritten. Also as a result, the new SYNC field 308, DAM field 310, and DATA field 1024 are offset by the R/W gap spacing (in bytes) relative to the original locations at format time as illustrated in FIG. 3A. Therefore, a number of bytes (identical to the read-to-write gap spacing) of the original GAP3 field 314 are overwritten. This must be accounted for along with the worst case speed variation for the particular drive. This is accommodated by programming the length of GAP3 to be slightly longer during formatting. For one embodiment of the present invention, GAP3 is extended during formatting from 218 bytes to 233 bytes as illustrated in FIGS. 3C and 3D.

As discussed above in conjunction with FIG. 3C, the data sector illustrated in FIG. 3D is read with the flexible disk controller in conventional mode. Therefore, as with FIG. 3C, the flexible disk controller reads the CRC ID field 304 and waits for a time equivalent to 24 bytes before enabling the phase-locked-loop to lock onto incoming data. As with FIG. 3C, the phase-locked-loop for FIG. 3D is enabled in the GAP2 field 306 as illustrated by the dashed line 320. As with FIG. 3C, the SYNC pattern is not detected earlier than the new SYNC field and there is no discontinuity to cause mis-locking on a harmonic frequency. The phase-locked-loop synchronizes correctly on the full 12-byte SYNC field 308.

As discussed above in conjunction with FIG. 3C, writing must be delayed when the write gap lags the read gap. The worst case delay is given by the following equation:

$$DELAY_{MAX} = \frac{(R/W\ GAP)_{MAX}}{(Relative\ Speed)_{MIN}} \times \frac{Bits}{Inch} \times \frac{1\ Byte}{8\ Bits} - 3\ Bytes$$

For one embodiment of the present invention, the maximum read-write (R/W) gap spacing is 1.8 mils (0.0018 inches), the minimum relative speed is 0.907 (speed during formatting 9.3% slower than speed during rewrite), and the bit density is 42,000 bits per inch. The resulting necessary delay is approximately 7.5 bytes.

Figure 4:
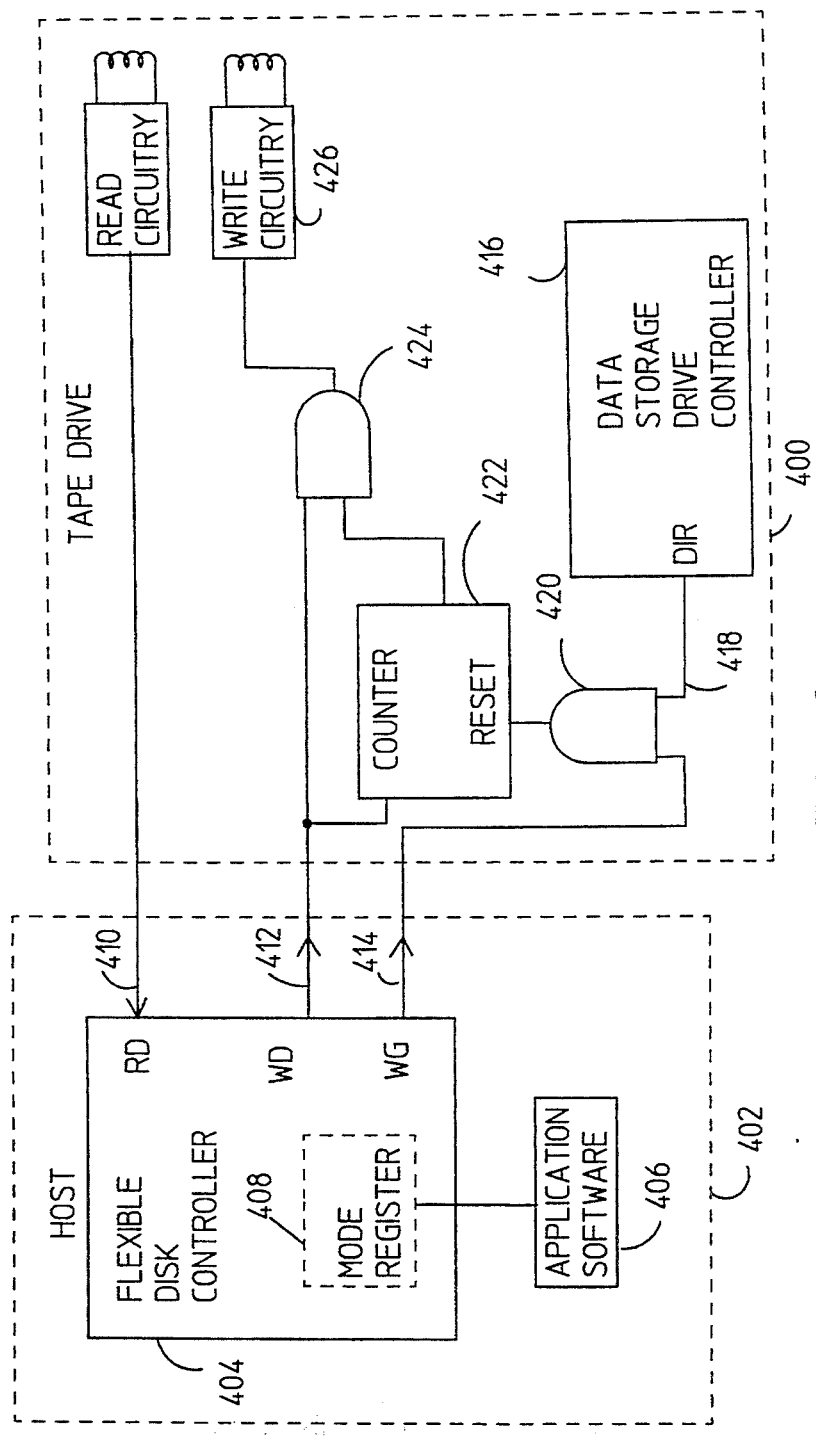
FIG. 4 is a schematic block diagram illustrating circuitry to temporarily suppress a writing signal from a flexible disk controller when using a dual-gap head with a write/erase gap lagging the read gap (FIG. 1C).

FIG. 4 illustrates circuitry to delay writing when medium motion relative to the head is such that writing lags reading (FIG. 1C). In FIG. 4, a data storage drive 400 (tape or flexible disk) is attached to a host computer 402. The host computer 402 includes a flexible disk controller 404 which is controlled by host application software 406. In accordance with the present invention, the flexible disk controller 404 can be operated in two different modes, perpendicular recording and conventional. The mode is controlled by the host software 406 by writing to a register 408 within the controller 404. The flexible disk controller 404 has a Read Data (RD) input 410, a Write Data (WD) output 412 and a Write Gate (WG) output 414. The Write Gate signal 414 indicates whether the controller 414 is reading data or writing data.

The Write Data output 412 is a series of pulses. Referring to FIG. 3A, at format time, GAP2 (306) is written with a standard data pattern corresponding to Hexadecimal 4E (binary 01001110) repeating 41 times. This pattern is recorded using MFM encoding. MFM encoding of 4E HEX results in 6 magnetic direction changes per byte. Referring again to FIG. 4, each byte of 4E HEX data results in 6 digital pulses on Write Data 404. For the example of a delay of 7.5 bytes, the delay may be implemented by disabling writing for 44 Write Data pulses during GAP2 306.

Continuing with FIG. 4, the data storage drive 400 has a separate controller 416 for controlling a motor to drive the medium and other data storage drive specific functions. A direction signal (DIR) 418 indicates the direction of medium movement. If medium movement is in the direction corresponding to FIG. 1C (DIR is logical TRUE), and the flexible disk controller is writing data (WD is logical TRUE), then a logical AND gate 420 resets a counter 422. Counter 422 is reset on a rising edge of the reset signal. Counter 502 is preprogrammed to count 44 pulses before setting an output to logical TRUE. When the counter 422 output is logical TRUE, Write Data (412) pulses from the Flexible Disk Controller 404 drive the output of logical AND gate 424 which in turn drives write circuitry 426.

Figure 5:
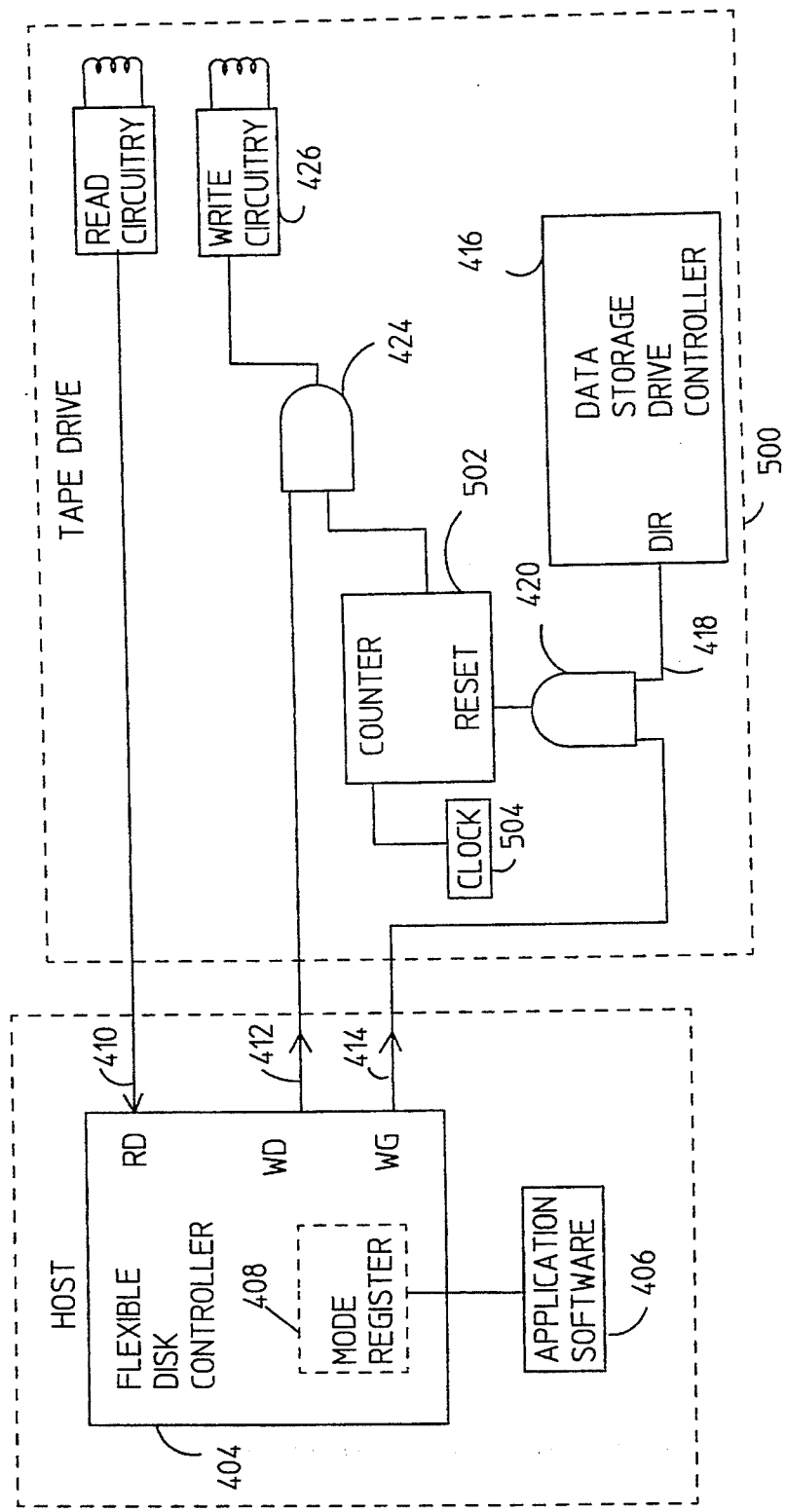
FIG. 5 is a schematic block diagram illustrating alternative circuitry to temporarily suppress a writing signal from a flexible disk controller when using a dual-gap head with a write/erase gap lagging the read gap (FIG. 1C).
Figure 6:
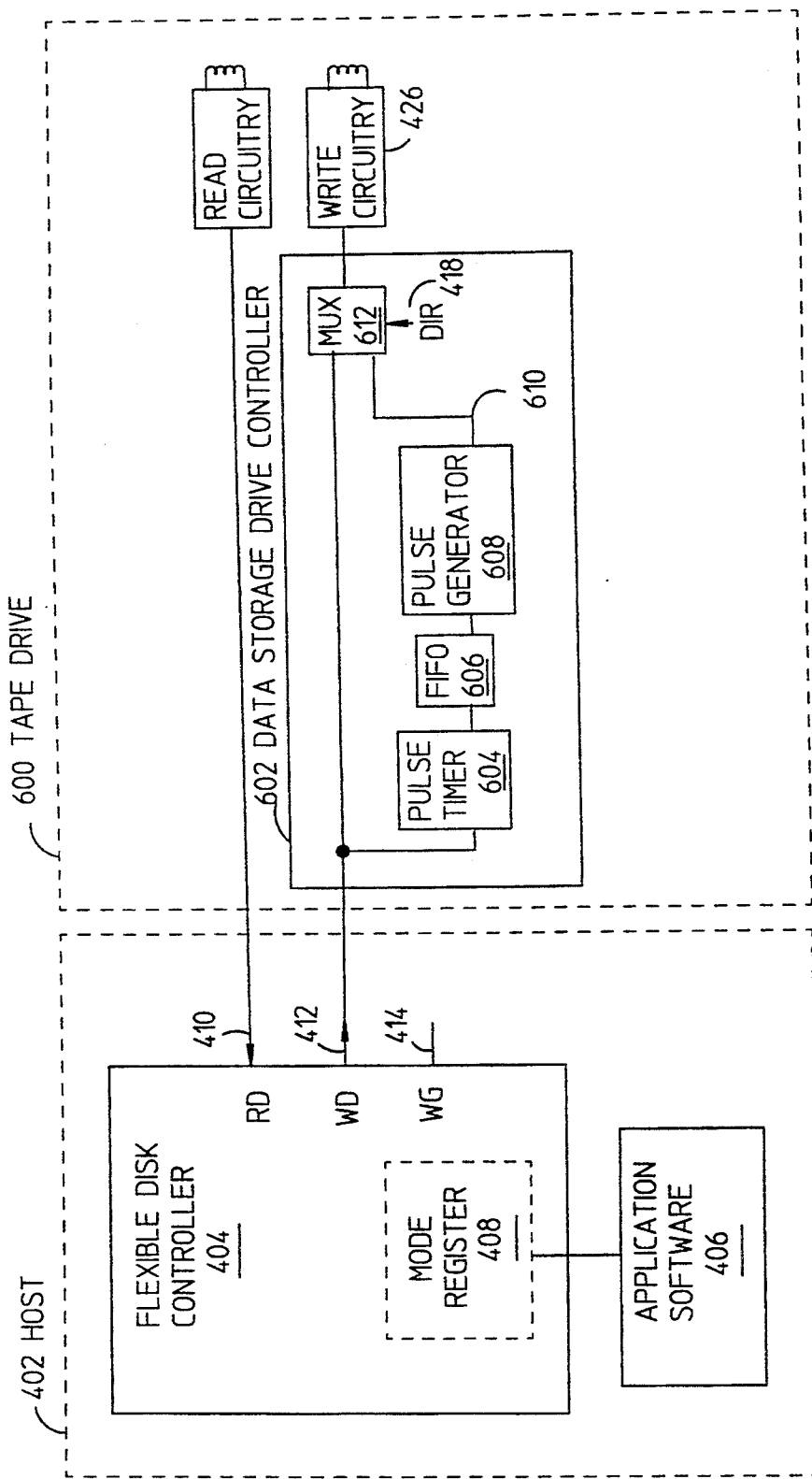

The circuit illustrated in FIG. 4 uses actual GAP2 data to control the delay. However, a fixed time delay is sufficiently accurate. FIG. 5 illustrates a delay circuit using a fixed time delay. In FIG. 5, counter 502 counts an on-board clock signal 504 to delay writing to a medium for a time approximately equal to the time corresponding to 44 Write Data pulses. FIGS. 4 and 5 illustrate disabling of writing during GAP2 306. FIG. 6 illustrates an embodiment that delays writing during GAP2 (306) rather than disabling writing as illustrated in FIGS. 4 and 5. In FIG. 6, the tape drive 600 includes a microprocessor based controller 602. The controller 602 includes a pulse timer 604, a first-input-first-output buffer (FIFO) 606, a pulse-generator 608 and a two-input-one-output multiplexer 612. The pulse timer 604, the FIFO 606, the pulse generator 608 and the multiplexer 612 are depicted as separate hardware functional blocks but are preferably implemented entirely within a microprocessor. Hardware external to the microprocessor may be used if necessary. For the pulse timer function 604, the microprocessor counts clocks from one Write Data pulse 4 12 to the next. The microprocessor then pushes the numerical time values onto a first-in-first-out (606) stack (internal) or buffer (external). Within the pulse generator function 608, numerical time values from the output of the FIFO 606 are used to time the generation of new pulses (610). The multiplexer function 612 switches either the original Write Data pulses 412 or the delayed data pulses 610 to the write circuitry 426, depending on the state of the direction signal 418. As discussed above, for an embodiment having a gap spacing of 0.0018 inches (4.6 mm) and a bit density of 42,000 bits per inch, the required delay is 7.5 bytes. As discussed above in conjunction with FIG. 4, 7.5 bytes of GAP2 (306) pattern are encoded into 44 Write Data pulses. Therefore, for the example embodiment, the FIFO 606 must have the capacity to store 44 numerical time values.

From the above description, it can be seen that the present invention enables use of a relatively low cost dual-gap head with a commercially available flexible disk controller. The present invention enables flexible disk drives or similar devices to increase bit-density by using a dual gap head design with conventional media. The invention as disclosed can be used for unidirectional medium movement relative to the head or bidirectional medium movement relative to the head. The present invention is especially useful for bidirectional tape drives sharing a flexible disk controller.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A data storage system comprising:
   a magnetic head having a first gap adapted for writing data and a second gap adapted for reading data;
   a controller, connected to the magnetic head, having a first mode for a first density and a second mode for a second density; and
   wherein the controller uses the first mode to write data to a magnetic medium using the first gap and uses the second mode to read the data that was written in the first mode from the magnetic medium using the second gap.

2. A data storage system as in claim 1 wherein the magnetic head is mounted in a magnetic tape drive.

3. A data storage system as in claim 1 wherein the magnetic head is mounted in a flexible disk drive.

4. A data storage system comprising:
   a magnetic head having a first gap and a second gap;
   a controller, connected to the magnetic head, having a first mode for perpendicular mode reading and writing and a second mode for longitudinal mode reading and writing; and
   wherein the controller uses the first mode to write data to a magnetic medium using the first gap and uses the second mode to read the data that was written in the first mode from the magnetic medium using the second gap.

5. A data storage system as in claim 4 wherein the magnetic medium moves relative to the magnetic head such that in a first direction of relative movement writing leads reading and in a second direction of relative movement writing lags reading, the data storage system further comprising:
   a Write Data signal received by the controller;
   a write circuit, within the controller, having a write circuit input and a write circuit output, the write circuit output connected to the second gap; and
   a delay circuit, within the controller, having a delay input receiving the Write Data signal and a delay output connected to the write circuit input, for delaying the Write Data signal when the relative movement of the magnetic medium is in the second direction.

6. A data storage system as in claim 5, wherein the Write Data signal comprises a sequence of pulses, the delay circuit further comprising:
   a control gate having first and second gate inputs and a gate output, the gate output connected to the write circuit input, the first gate input receiving the Write Data signal;
   a counter having a counter input and a counter output, the counter output connected to the second gate input, the counter input receiving the Write Data signal; and a predetermined number, the gate output being suppressed until the counter counts the predetermined number of the pulses.

7. A data storage system as in claim 6, the delay circuit further comprising:
   a control gate having first and second gate inputs and a gate output, the gate output connected to the write circuit input, the first gate input receiving the Write Data signal;
   a clock signal comprising a sequence of clock pulses;
   a counter having a counter input and a counter output, the counter output connected to the second gate input, the counter input receiving the clock signal; and
   a predetermined number, the gate output being suppressed until the counter counts the predetermined number of the clock pulses.

8. A data storage system as in claim 7, wherein the Write Data signal comprises a sequence of pulses having a sequence of time intervals between consecutive pulses, the delay circuit further comprising:
   a pulse timer having a timer input and a timer output, the timer input receiving the Write Data signal, the timer converting the time intervals into numerical time values at the timer output;
   a data buffer having a buffer input and a buffer output, the buffer input receiving the numerical values from the timer output and sending the numerical values at the buffer output; and
   a pulse generator having a generator input and a generator output, the generator input receiving the numerical time values from the buffer output, the generator output connected to the write circuit input, the pulse generator converting numerical values from the buffer output into times between pulses at the pulse generator output.

* * * * *